Aug. 26, 1930.  J. W. FERGUSON  1,773,778
COTTON CHOPPER
Filed July 5, 1928
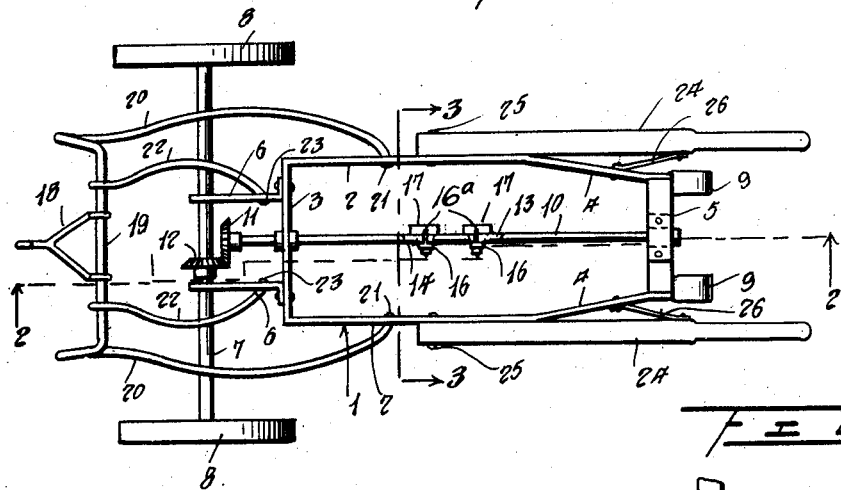
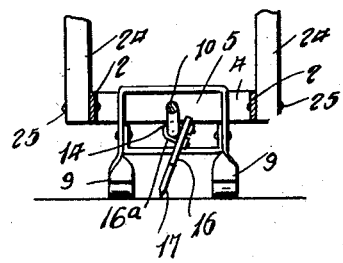
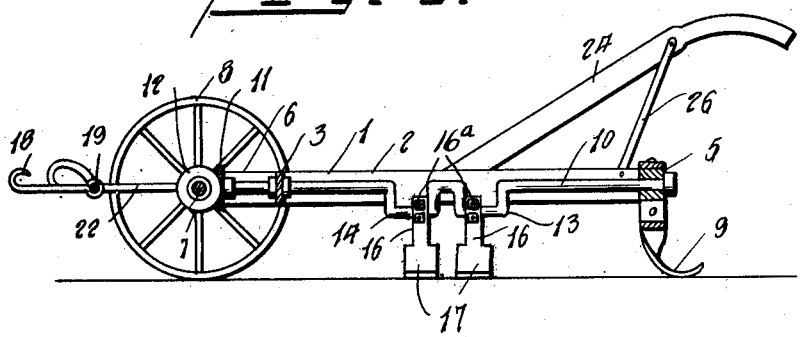
Inventor
J. W. Ferguson.
By L. F. Randolph Jr.
Attorney Patented Aug. 26, 1930

1,773,778

UNITED STATES PATENT OFFICE

JAMES WILLARD FERGUSON, OF SEABOARD, NORTH CAROLINA

COTTON CHOPPER

Application filed July 5, 1928. Serial No. 290,576.

The invention relates to an agricultural machine for thinning cotton plants and has for its object the provision of improved means for thinning the plants comprising a shaft that is actuated through connections with the ground wheels and having spaced crank arms on said shaft and in alinement on which are adjustably mounted the chopper blades, said blades being adjustable relatively to one another to insure thinning the plants as may be desired so as to leave two or three or more plants in each hill.

The invention will be described in detail hereinafter and will be found illustrated in the accompanying drawings in which Figure 1 is a top plan view of the improved cotton chopper, Figure 2 is a longitudinal sectional view on a plane indicated by the line 2—2 of Figure 1, and Figure 3 is a transverse sectional view on a plane indicated by the line 3—3 of Figure 1.

In the drawings similar reference characters are used to designate corresponding parts throughout the several views.

The improved cotton chopper comprises a frame 1 having side bars 2, a front cross bar 3, and the rear ends of the side bars 2 converged as shown at 4 with a cross bar 5 secured between the converged ends of said side bars 2. Drag arms 6 are secured to the cross bar 3 and journal the axle shaft 7 on which is secured the ground wheels 8, thus supporting the front end of the frame 1, while the rear end of the frame is supported by drag feet 9 secured to the rear cross bar 5 and curved rearwardly as shown, and spaced laterally from one another so that said feet may slide on opposite sides of a row of plants to be thinned. 10 indicates a shaft journaled in the cross bars 3 and 5 and geared to the axle shaft 7 by means of the beveled pinions 11 and 12 secured to the shaft 10 and axle shaft 7 respectively. Shaft 10 is formed with spaced crank arms 13 and 14 that are alined with one another and to which are adapted to be secured the shanks 16 of chopper blades 17, by means of the U-shaped clamping members 16ª said chopper blades being adapted to be adjusted toward and from one another on said crank arms 13 and 14 to provide for chopping out more or less of plants in a hill.

The draft means comprises a clevis 18 that is secured to a bar 19 having rearwardly extending arms 20 secured as shown at 21 to the side beams 2 of the frame 1, and 22 indicates other bars connecting said bar 19 with the drag members 6 as shown at 23. 24 indicates the handles for the operator secured as at 25 to the side bars 2 and 26 are braces for said handles 24.

What is claimed is:—

1. In a cotton chopper, a shaft, means to rotate the shaft, spaced crank arms on said shaft, chopping blades, and means to secure said chopping blades to said crank arms, said means comprising clamps engaging said crank arms and blades and providing means for arranging the blades at selected distances from one another.

2. In a cotton chopper, a shaft, means to rotate the shaft, spaced crank arms on said shaft, chopping blades, and U-shaped clamping devices holding said blades on the crank arms and providing means for arranging the blades at selected distances from one another.

In testimony whereof I affix my signature.

JAMES WILLARD FERGUSON.